SIGNAL TRANSLATING AND SHIFTING CIRCUITS

Filed May 24, 1961

INVENTOR
WILLIAM W. DAVIS

BY Cushman, Darby & Cushman
ATTORNEYS

United States Patent Office 3,066,283
Patented Nov. 27, 1962

3,066,283

SIGNAL TRANSLATING AND SHIFTING CIRCUITS

William W. Davis, Minneapolis, Minn., assignor to Sperry Rand Corporation, New York, N.Y., a corporation of Delaware Filed May 24, 1961, Ser. No. 112,290
1 Claim. (Cl. 340—174)

This invention pertains to circuits or devices utilizing magnetic elements for selectively generating output signals depending upon the condition of two or more input signals, and more particularly to such devices in circuits for the coding, shifting or other handling of a plurality of digital signals.

It has been heretofore known that shifting, coding, etc. of a plurality of digital signals may be carried out by providing a matrix having a plurality of conductors forming columns, rows, and at each intersection of columns and rows a magnetic core element coupled to the various conductors. Such circuitry is described in detail in the copending application of Richard M. Sanders, Ser. No. 62,440, filed October 13, 1960, and entitled Digital Shift Circuit, assigned to the assignee of the present invention. The present invention constitutes an improvement in the construction of each matrix intersection in the manner described more fully hereinbelow.

All of the various objects and advantages of this invention will become fully apparent from the following detailed description of an illustrative embodiment of the invention, and from the appended claims.

The illustrative embodiment may be best understood with reference to the accompanying drawings, wherein.

Figures 1, 2, 3, 4:
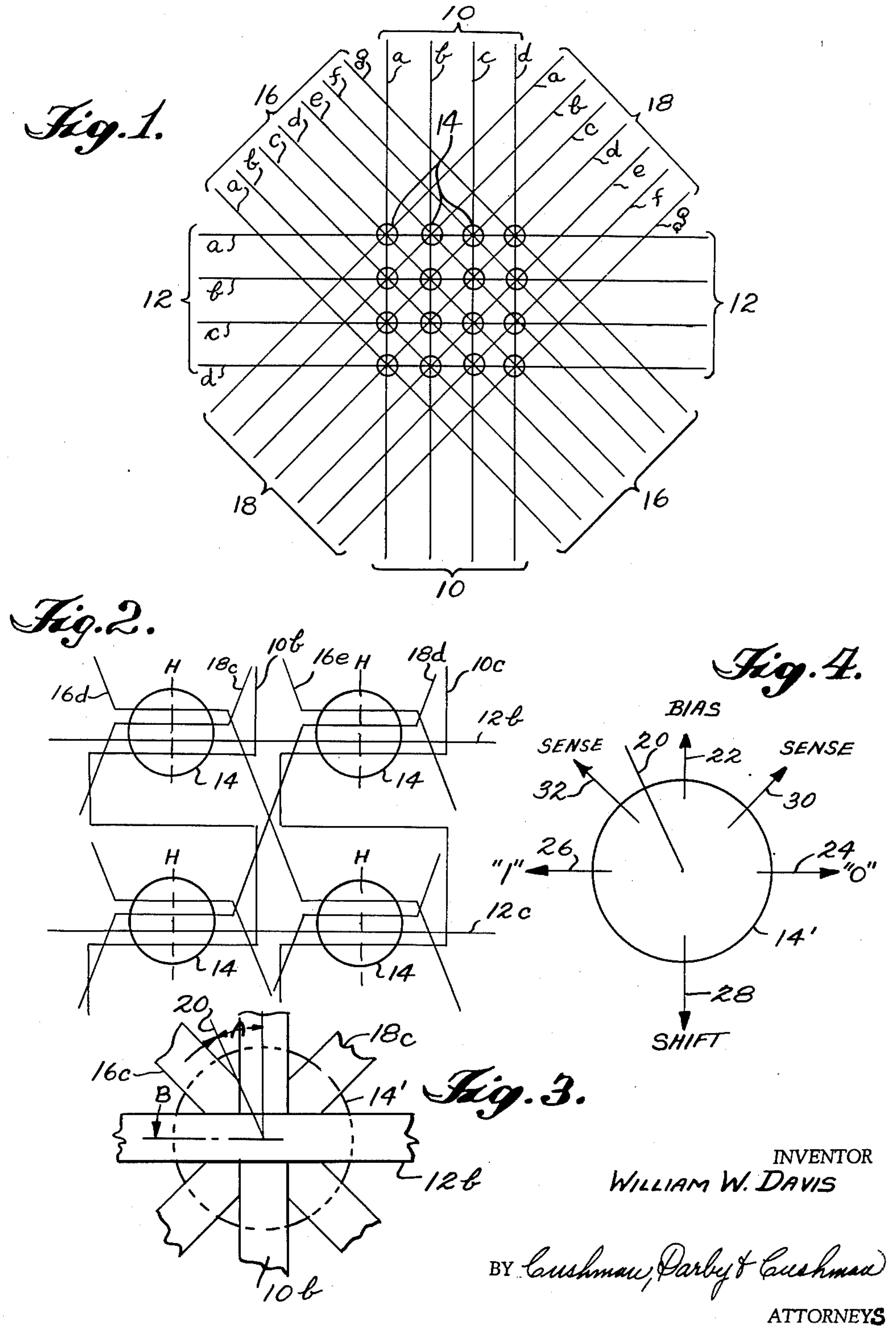
FIGURE 1 shows a diagrammatic presentation of a shifting matrix utilizing the principles of this invention.
FIGURE 2 shows the path of conductors in a matrix in accordance with the teachings of the aforesaid copending application.
FIGURE 3 shows the details of construction of an intersection of a matrix in accordance with FIG. 1 but utilizing the principles of the present invention.

FIGURE 4 diagrammatically shows the direction of vectors representing fields which result from currents through the conductors of FIG. 3.

First referring to FIG. 1 of the present application, it will be understood from the contents of the aforesaid copending application of Sanders that parallel shifting of a plurality of digital signals may occur by providing a first set of digit input electrical conductors 10 intersecting with a second set of shifting electrical conductors 12, preferably at right angles, thereby forming a plurality of matrix intersections 14. At least one additional set of sensing or parallel output conductors 16 is provided, running through the matrix intersections along a diagonal. A still further set of sensing or output parallel conductors 18 may be employed running through the matrix on the opposite diagonal.

As explained in the aforesaid copending application of Sanders, each matrix intersection 14 comprises a magnetic element or core. In operation, digits may be shifted to the right by the use of conductors 16, or to the left by the use of the conductors 18. Briefly stated, let it be assumed that all of the elements 14 are in a like predetermined state of magnetization. Let it further be assumed that said conductors of set 10, say conductors 10*a* and 10*b*, are carrying current in a downward direction as shown in FIG. 1. Let it additionally be assumed that the other conductors 10*c* and 10*d* are carrying current in the opposite or upward direction as shown in FIG. 1. Now if a current pulse is applied through any one of the conductors of the set 12, certain magnetic effects will take place in the matrix intersections 14 along that row as a result of which certain currents may be induced or generated in certain of the conductors of sets 16 and 18. In this way, depending upon which one of the conductors of set 12 was energized, and the initial magnetic state of the intersection elements involved, a certain reproduction of the signals of the conductors of set 10 will be generated upon certain of the conductors of the sense conductor sets 16 and 18.

The aforesaid copending application of Sanders with reference to its FIG. 2, explains that a matrix circuit as just described is particularly adapted for the use at each intersection of magnet film cores or elements having uniaxial anisotropy. Such cores consist of saturable ferromagnetic material and have a preferred or easy magnetization direction or axis in the plane of the film and a difficult or hard magnetic direction or axis in the plane of the film and perpendicular to the easy axis.

The remanent magnetization of the element tends to be aligned with the easy axis. The hysteresis characteristic along the easy axis is that of a permanent magnet, while the characteristic along the hard axis is that of a saturable transformer core. The Sanders application explains that a magnetic film core or element may be used in a matrix as above described by having all of the conductors positioned in a given direction and all parallel to each other and all at right angles to the hard or difficult direction of magnetization of the film element. While this is a quite operable embodiment of the Sanders invention, it nevertheless requires a great many bends or turns in some of the various conductors. For example, as shown in FIG. 2 of the present application, where four intersection elements 14 in the form of magnetic thin films having a hard axis of magnetization designated by the line H are shown, column conductors such as 10*b* and 10*c* must undergo repeated right-angled turns in order that these conductors pass adjacent the elements 14 in the same directions. Also the right-hand sense conductors such as 16*d* and 16*e*, and the left-hand sense conductors 18*c* and 18*d* must undergo repeated turns greater than 45° in order that they may pass the elements in the same directions. Only the remaining conductors such as 12*b* and 12*c* are able to proceed through the matrix without turns. The bending or turning of conductors has been found to be a considerable disadvantage, inasmuch as delay in the propagation of signals is encountered and also various difficulties are introduced in the fabrication of a matrix involving same.

Referring now to FIG. 3, in accordance with the present invention, it has been discovered that a matrix intersection may be constructed utilizing a magnetic film element of the type above described, here designated 14', having the digit or input conductor, for example 10*b*, arranged to lie with its axis at an angle A to the easy axis or direction of the element 14'. In FIG. 3, the triangular indicator identified by reference character 20 points along the easy axis, and in the direction of remanent magnetization of the element. A second conductor, of the shift set 12, for example 12*b*, is arranged at an angle to the conductor 10*b* and also at an angle B from the the easy axis. In FIG. 3 angle A is about 25° and the angle $(A+B)$ is 90°. However, as will become apparent hereinbelow, these particular angles are not critical.

As further shown in FIG. 3, a sense line, for example 16*c*, proceeds across the element 14' at an angle which is substantially 45° to conductors 10*b* and 12*b*. An additional sense line 18*c* also crosses the element 14', at 45° to conductors 10*b* and 12*b* and at right angles to conductors 16*c*.

The manner in which a construction may be made using a magnetic film element and ribbon-like conductors in planes parallel to the plane of the film and sufficiently close thereto for the conductors to be magnetically coupled to the element has been heretofore described. A complete explanation may be found, for example, in the copending application of Sidney Rubens et al. entitled "Methods for Making Laminated Structures," Ser. No. 13,361, filed March 7, 1960, and assigned to the assignee of the present invention.

It will be understood that in making up a matrix of magnetic film elements or cores, the entire plurality of elements will usually be created upon a single piece of substrate material, and in any event, it will be preferred to have the axis of easy magnetization of each element lie in a given direction.

The operation of an intersection as shown in FIG. 3, and an entire matrix of such intersections of the type shown in FIG. 1, can be best understood with reference to FIG. 4, which shows a vector analysis of an intersection as shown in FIG. 3. In FIG. 4, the element is again shown in plan view (the plane of the element in the plane of the paper) and the direction of the easy axis of magnetization is again shown by reference character 20, it further being understood that the remanent magnetization along the easy axis (in the absence of additional fields), is in the direction of the arrowhead shown in FIG. 4.

In a matrix as shown in FIG. 1, and particularly with reference to the copending application of Sanders, hereinabove mentioned, and the layout shown in its FIG. 1, the conductor set 10 may be termed an input or digit set. The set 12 may be referred to as a shift set. The sets 16 and 18 may be termed respectively, the right-hand shift and the left-hand shift sets. Using this terminology and referring to FIG. 4 (what may be termed), the magnetic field axis of the digit line 12*b* is positioned at right angles to the direction of the actual conductor 12*b* of FIG. 3. This is because the magnetic field applied by the conductor is at right angles to the direction of current flow within the conductor, as is well-known. Similarly, in FIG. 4, the field axis of the input or digit conductor 10*b* is at right angles to the position of the actual conductor 10*b*. Similarly, the magnetic axes for the sense lines as shown in FIG. 4, are at right angles to the positions of the conductors as shown in FIG. 3.

FIGURE 4 shows a vector 22 indicating the direction of application of a bias field to the element 14', which may be applied by a steady current flowing leftwardly in conductor 12*b*. In FIG. 4, vector 24 represents a given polarity field resulting from current flowing in an upward direction in the digit line conductor 10*b*. This may be said to represent a "0" digit input.

Alternatively, to represent a "1" input, the direction of applied field would be in accordance with a vector 26 in FIG. 4 as a result of current flowing downwardly in conductor 10*b*. A shift pulse of current flowing rightwardly in conductor 12*b*, cancels the bias field, and causes a field in the direction of vector 28 in FIG. 4.

In operation, and now particularly referring to FIG. 4, if a "0" is to be represented by a current flowing in a given conductor of set 10, this current will be caused to flow in a direction to establish an applied field in the direction of vector 24, of such strength as to rotate the remanent magnetization vector 20 clockwise, so that it lies substantially in opposition to the shift pulse vector 28. As to whatever bias is present, its effect would be accounted for in relation to the field represented by vector 24 so that a "0" field would bring the remanent magnetization into opposition with vector 28. Rotational behaviour of the remanent magnetization with respect to the easy axis of magnetization is fully described by C. D. Olson and A. V. Pohm in "Flux Reversal in Thin Films of 82% Ni, 18% Fe" on page 274 and by R. M. Sanders and T. D. Rossing in "Reversible Rotation in Magnetic Films" on page 288, Journal of Applied Physics, vol. 29, No. 3, March 1958.

If during the period of duration of the "0" signal in the digit line, a shift current applies a field in the direction of vector 28 of FIG. 4, no further significant rotation of the remanent magnetization vector 20 will occur, this being due to the vectors 20 and 28 being aligned in opposition. As a result, no signals will be induced in the sense lines 16*d* or 18*c*. However, if all of the conditions are the same, except that the current in the digit line conductor 12*b* represents a "1" and therefore applies a field according to the vector 26 of FIG. 4, the remanent magnetization vector will now be rotated counter-clockwise as viewed in FIG. 4. As the remanent magnetization vector is now held in a rotated position even further from vector 28, and a shift pulse applies a field according to vector 28, the remanent magnetization will rotate even further counter-clockwise, which gives rise to induced signals in the sense lines 16*c* and 18*c*, vectors 30 and 32, respectively, on FIG. 4, representing the signals in these conductors. As to output signals in sense conductors, it is to be understood that optimum output will occur therein for a particular direction thereof in relation to the easy axis. Conductors 16 occupy a favorable position in the present illustrative embodiment. Conductors 18 are in an inferior direction, wherefore more sensitive output equipment would be required to detect and use the currents induced therein.

Thus it is that an intersection either will or will not generate a pulse on a sense line coupled thereto, depending upon whether the digit input is "0" or a "1," and the functional equivalent of the operation at the intersections of the matrix of the Sanders application results. However, the new form of intersection permits much faster operation because delays due to bends in the conductors are avoided, also operation by magnetic rotation is far more rapid than the switching of ordinary cores.

The bias field represented by vector 22 in FIG. 4 is not absolutely essential. However, such a bias field is thought to be useful to insure the return of the remanent magnetization to its original state (vector 20) after the application of a shift pulse (vector 28). Such a bias field may be readily achieved by having the shift line normally carry a biasing current in a given direction, and providing for a reversal of this current to be a shift pulse.

It may be mentioned that while a separate conductor from a bias source 94 is shown in FIG. 2 of the aforesaid Sanders application, no such line is shown in FIG. 2 of the present application in view of the possibility of simply reversing the shifting current to provide a biasing field.

It will now be apparent that the basic requirement of the present invention is to broadly provide some angle between the direction of the easy axis and the direction of application of a shift pulse field, so that an input field applied in a first direction also at angles to the shift field and the easy axis will rotate the remanent magnetization so that it will not be further rotated by the shift field when applied. This precludes an output pulse on a sense line, which latter may be at any angle to the conductor and the easy axis. However, reversal of the current in the input line will rotate the remanent magnetization still further out of alignment with the direction of the shift field, and signals will be induced in the sense lines. As hereinabove indicated, for shifting matrices the digit conductors or the shifting conductors will be substantially at right angles to one another and the sense lines will be at 45° to the aforesaid conductors. In general it will be satisfactory for the easy axis to lie at any angle within the angle between the digit and shift lines. However, an angle of about 25° as shown in FIG. 4 is preferable.

While the illustrative embodiment is a shifting matrix, no limitation thereto is necessary or intended. In general, it is to be understood that the foregoing detailed description of an illustrative embodiment of the invention has been given only to aid in the presentation of the basic features of the invention, the true scope whereof is to be determined from the appended claim.

What is claimed is:

In a digital matrix of at least two columns, two rows and four intersections, a magnetic film element at each intersection having easy and hard axes of magnetization and capable of operation in the rotational mode, a first set of conductors extending substantially straight in a column direction for carrying first input currents, each conductor of this set being magnetically coupled to all of the elements of a column, a second set of conductors extending substantially straight in a row direction for carrying second input currents, each conductor of this set being magnetically coupled to all of the elements of a row, a third set of conductors extending substantially straight in a diagonal direction for having output currents induced therein, each conductor of this set being magnetically coupled to the element or elements existing on said diagonal, the conductors of each set at every intersection being in a plane parallel to the plane of the element and sufficiently close thereto to be magnetically coupled thereto, the easy axis of magnetization of the element at each intersection being at an angle to the direction of the conductors of the first and second sets, the arrangement being such that an input current of predetermined magnitude at each given intersection in a first direction in a conductor of the first set will cause the remanent magnetization of the element to rotate so as to be in substantial opposition to the field applied by a second input current in a given direction in the conductor of the second set, but an input current in the opposite direction in the conductor of the first set will rotate the remanent magnetization to be out of alignment with the field of a current in the conductor of the second set, the direction of the conductor of the third set being such that upon the just recited rotation of remanent magnetization, an output current will be induced therein.

References Cited in the file of this patent

UNITED STATES PATENTS 3,023,402 Bittmann -------------- Feb. 27, 1962